US012010584B2

(12) United States Patent
Patton

(10) Patent No.: US 12,010,584 B2
(45) Date of Patent: Jun. 11, 2024

(54) SEX TRAFFICKING PREVENTION MOBILE APPLICATION

(71) Applicant: Jaime Patton, Conyers, GA (US)

(72) Inventor: Jaime Patton, Conyers, GA (US)

( * ) Notice: Subject to any disclaimer, the term of this patent is extended or adjusted under 35 U.S.C. 154(b) by 203 days.

(21) Appl. No.: 17/382,366

(22) Filed: Jul. 22, 2021

(65) Prior Publication Data

US 2023/0024798 A1  Jan. 26, 2023

(51) Int. Cl.
*H04W 4/00* (2018.01)
*H04M 11/04* (2006.01)
*H04W 4/02* (2018.01)
*H04W 4/024* (2018.01)
*H04W 4/029* (2018.01)
*H04W 4/90* (2018.01)

(52) U.S. Cl.
CPC .......... *H04W 4/029* (2018.02); *H04M 11/04* (2013.01); *H04W 4/023* (2013.01); *H04W 4/024* (2018.02); *H04W 4/90* (2018.02)

(58) Field of Classification Search
CPC ....... H04W 4/029; H04W 4/024; H04W 4/90; H04W 4/023; H04M 11/04
See application file for complete search history.

(56) References Cited

U.S. PATENT DOCUMENTS 11,240,367 B1 *  2/2022  Parker-Bello ..... H04M 1/72421

FOREIGN PATENT DOCUMENTS

KR  20180023925 A *  3/2018

* cited by examiner

*Primary Examiner* — Erika A Washington
(74) *Attorney, Agent, or Firm* — Incorporating Innovation LLC; Charlena Thorpe, Esq.

(57) ABSTRACT

Implementations of a sex trafficking prevention mobile application are provided. In some implementations, the sex trafficking prevention mobile application comprises a mobile application for a portable computing device, such as a smart phone or similar device, and a corresponding software application for a computing device, such as a desktop or laptop computer.
In some implementations, the sex trafficking prevention mobile application is configured to guide users to nearby safe locations to avoid or escape attack by sex traffickers. In some implementations, the sex trafficking prevention mobile application is configured to allow users to request nearby help from the community to avoid or escape attack by sex traffickers.

1 Claim, 7 Drawing Sheets

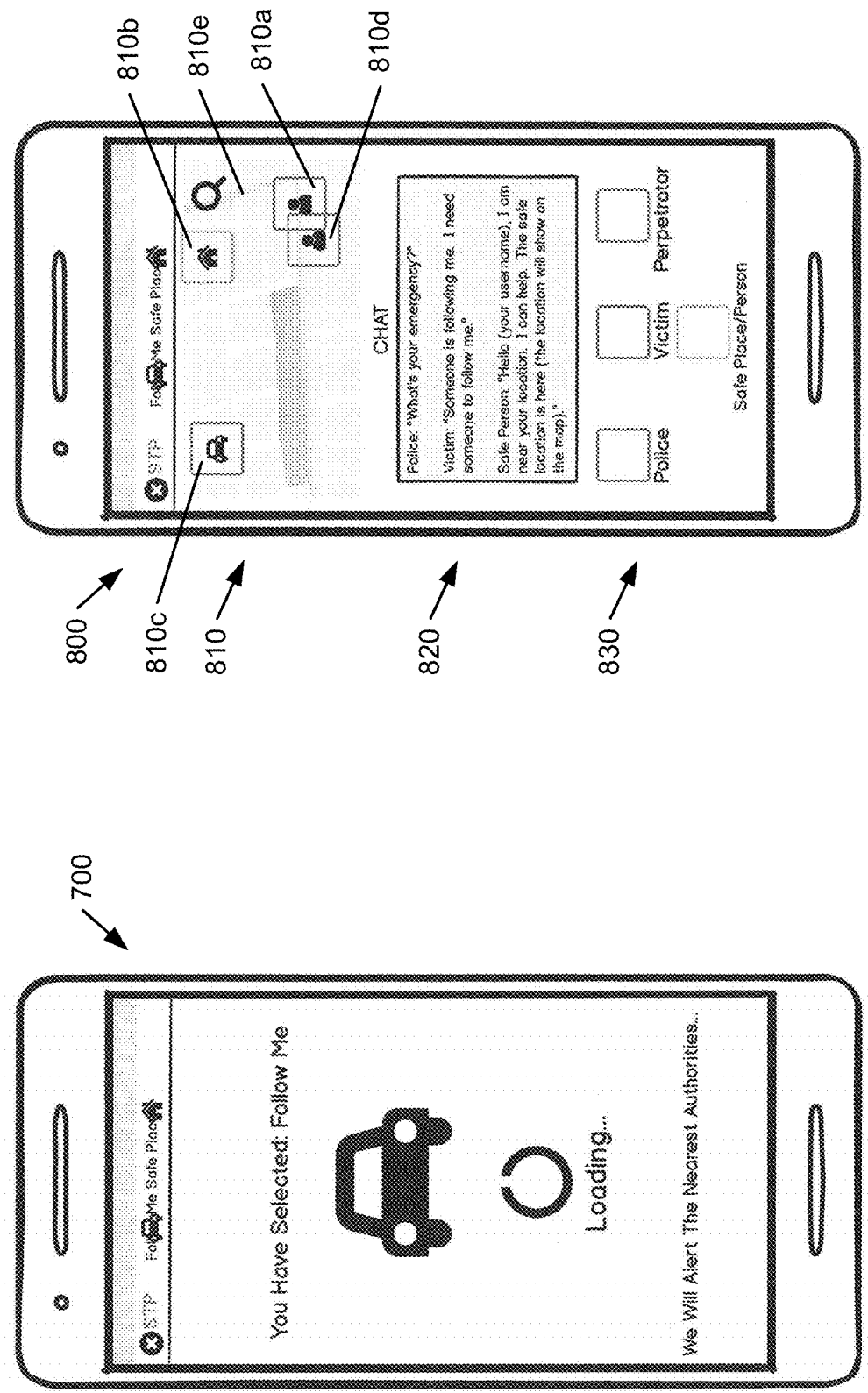

SEX TRAFFICKING PREVENTION MOBILE APPLICATION

TECHNICAL FIELD

This disclosure relates to implementations of a sex trafficking prevention mobile application.

BACKGROUND

Sex trafficking is a type of human trafficking occurs when a trafficker exploits an individual with force, fraud, or coercion to make them perform commercial sex. Sex trafficking includes the recruitment, harboring, transportation, provision, obtaining, patronizing, or soliciting of a person for the purpose of a commercial sex act.

Sex traffickers often stalk and kidnap victims, including in public places such as malls and parks, and particularly when such victims are alone and others are not around to help avoid or escape an attack. However, there does not exist a mobile application for preventing sex trafficking by helping victims to avoid or escape attack by guiding them to nearby safe locations or assisting them to request nearby help from the community.

BRIEF DESCRIPTION OF THE DRAWINGS

FIGS. 3-12 illustrate implementations of example user interfaces of the sex trafficking prevention mobile application according to the present disclosure.

DETAILED DESCRIPTION

Figure 1:
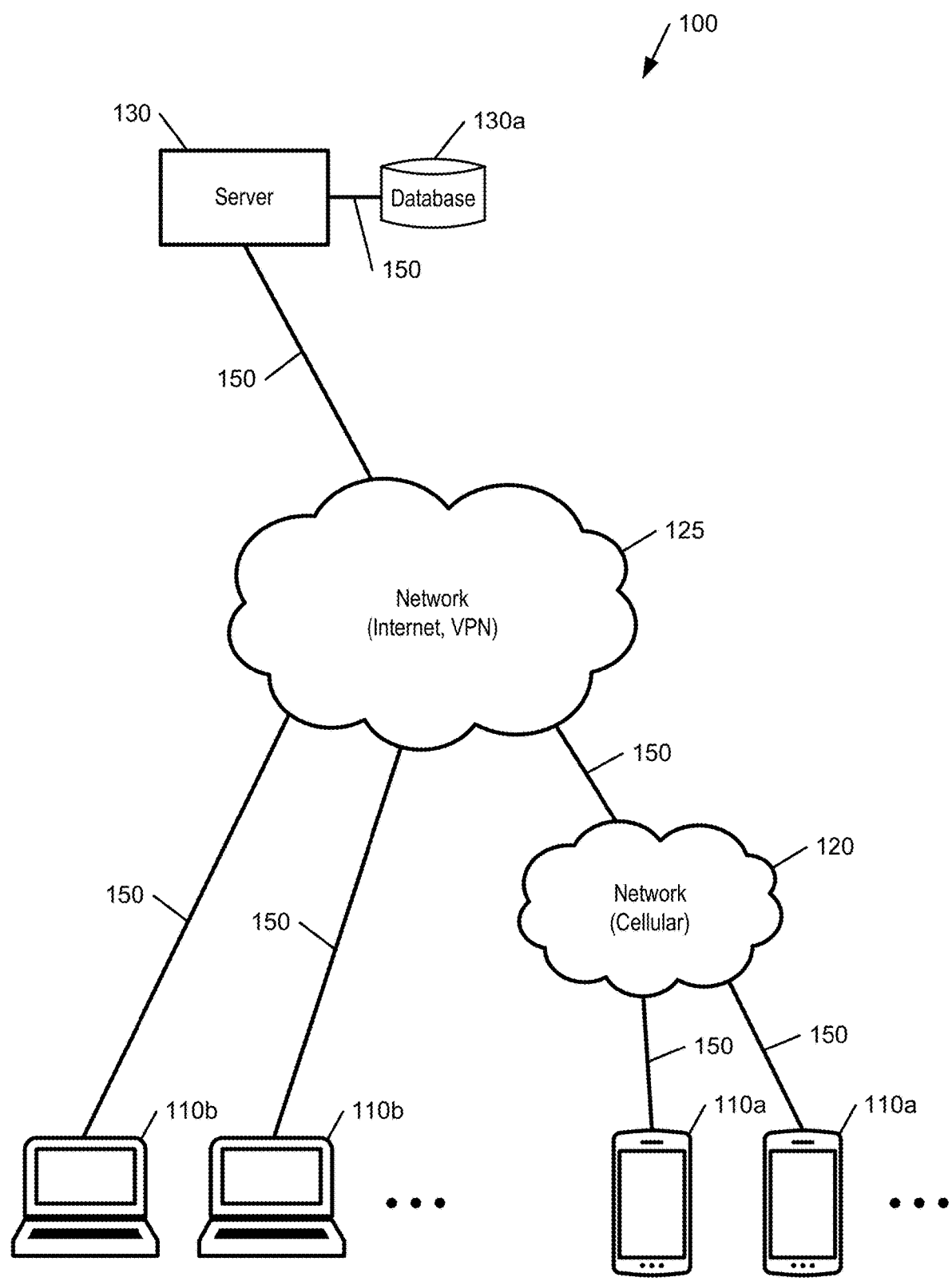
FIG. 1 illustrates an implementation of an example environment of the sex trafficking prevention mobile application according to the present disclosure.

Implementations of a sex trafficking prevention mobile application are provided. In some implementations, the sex trafficking prevention mobile application comprises a mobile application for a portable computing device, such as a smart phone or similar device (e.g., an Phone® or iPad®). In some implementations, the sex trafficking prevention mobile application may comprise a corresponding software application for a computing device, such as a desktop or laptop computer. Therefore, the sex trafficking prevention mobile application may be described or otherwise referred to collectively herein the present disclosure as an "application" or "software" for a "computing device".

In some implementations, the sex trafficking prevention mobile application is configured for preventing sex trafficking by helping victims to avoid or escape attack by sex traffickers.

In some implementations, the sex trafficking prevention mobile application is configured to guide victims to nearby safe locations to avoid or escape attack by sex traffickers. In some implementations, the sex trafficking prevention mobile application is configured to allow victims to request nearby help from the community to avoid or escape attack by sex traffickers.

In some implementations, the sex trafficking prevention mobile application is configured to prevent sex trafficking by helping kidnapped victims to escape his or her kidnapper.

In some implementations, the sex trafficking prevention mobile application is configured to allow a kidnapped victim to signal for help.

In some implementations, the sex trafficking prevention mobile application is configured to allow a kidnapped victim to use his or her mobile phone or similar computing device to connect with others on their mobile phone or similar computing device for help.

In some implementations, the sex trafficking prevention mobile application is configured to allow a user, such as an evading or kidnapped sex trafficking victim, to send out a request for help that can be received by other users of the sex trafficking prevention mobile application without having to go through the police or other applicable authorities.

In some implementations, the sex trafficking prevention mobile application is configured to allow a user, such as a potential sex trafficking victim, to look for nearby "safe places" where the user can go to avoid or escape a sex trafficker attack.

In some implementations, the sex trafficking prevention mobile application is configured to allow a user, such as a local community member, to mark his or her location as a "safe place" so that another user, such as a potential sex trafficking victim, can find the safe place using the sex trafficking prevention mobile application to avoid or escape a sex trafficker attack.

In some implementations, the sex trafficking prevention mobile application is configured to track the location of a portable computing device, such as a smart phone or similar device, on which the sex trafficking prevention mobile application is installed. In this way, in some implementations, a user of the sex trafficking prevention mobile application on the portable computing device, such as an evading or kidnapped sex trafficking victim, can select a "follow me" option so that the user's location can be tracked by other users of the sex trafficking prevention mobile application, such as community members, law enforcement, and/or other applicable persons (e.g., family, friends, etc.).

In some implementations, the sex trafficking prevention mobile application is configured to allow a user to update his or her status. In this way, for example, in some implementations, a user, such as an evading or escaping sex trafficking victim, can label himself or herself "safe" using the sex trafficking prevention mobile application once he or she is no longer threatened by a sex trafficker attack.

In some implementations, the sex trafficking prevention mobile application is configured to allow a user, such as an evading or kidnapped sex trafficking victim, to communicate directly with the police or other applicable authorities for help, such as via text or instant messaging.

In some implementations, the sex trafficking prevention mobile application is configured to allow a user to post messages or alerts, such as the location of a suspected sex trafficker or other suspicious person, that can be viewed by other users of the sex trafficking prevention mobile application. In this way, in some implementations, the sex trafficking prevention mobile application allows users to share information among each other to help avoid and prevent sex trafficker attacks.

In some implementations, the sex trafficking prevention mobile application is configured to display a news feed that reports relevant news and information to help avoid and prevent sex trafficking.

FIGS. 3-12 illustrate implementations of example user interfaces of the sex trafficking prevention mobile application according to the present disclosure. In some implementations, the sex trafficking prevention mobile application is configured to display the user interfaces illustrated in FIGS.

3-12 on a portable computing device, such as a smart phone or similar device, or a computing device, such as a desktop or laptop computer.

Figures 3, 4:
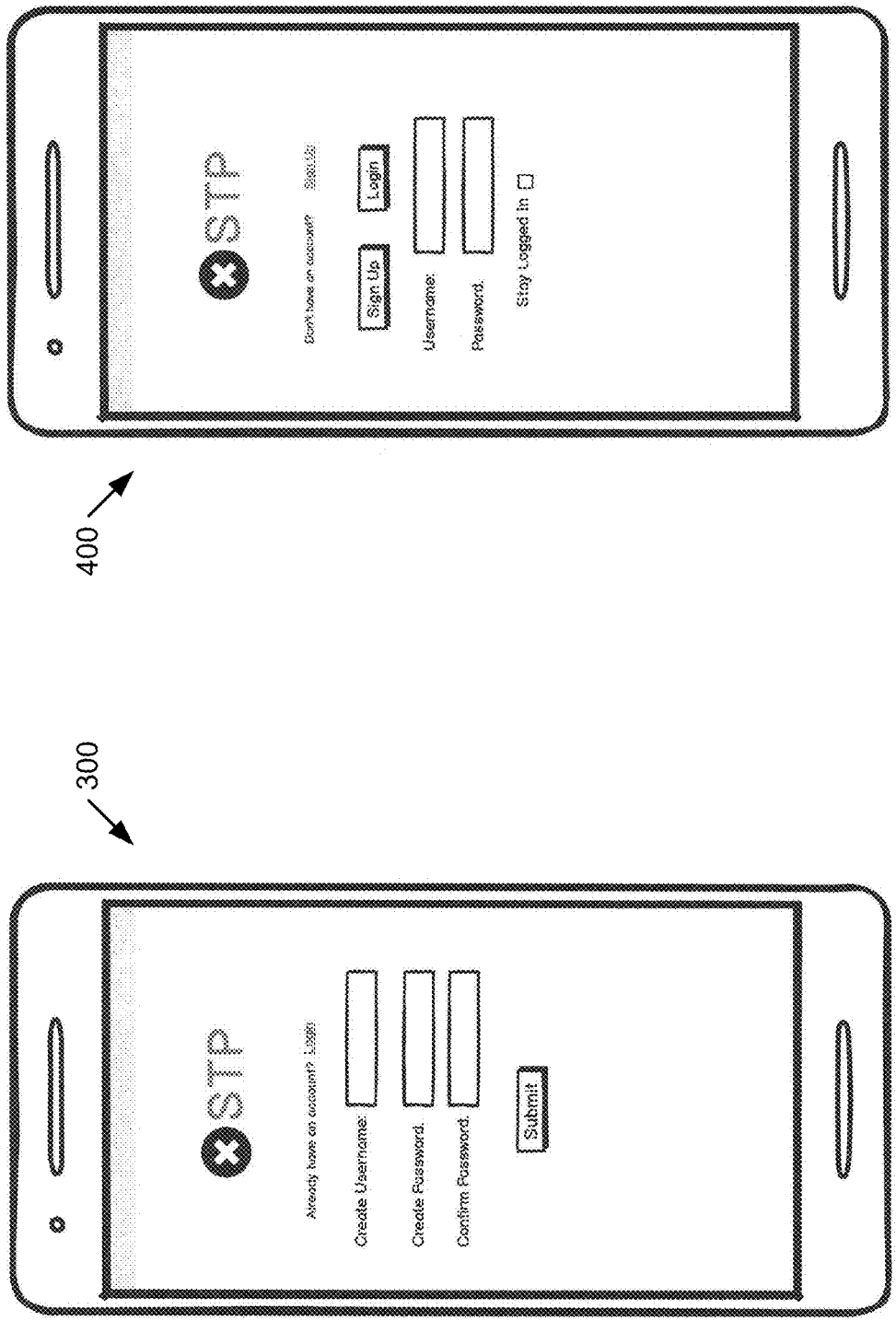

FIG. 3 illustrates a user interface 300 of the sex trafficking prevention mobile application displayed to allow a user to create an account for use of the features of the sex trafficking prevention mobile application, such as described above. As shown in FIG. 3, in some implementations, the user interface 300 allows a user to create a username and password for the user account.

FIG. 4 illustrates a user interface 400 of the sex trafficking prevention mobile application displayed to allow a user to login to an account for use of the features of the sex trafficking prevention mobile application, such as the features described above. As shown in FIG. 4, in some implementations, the user interface 400 allows a user to login with a username and password for the user account.

Figure 5:
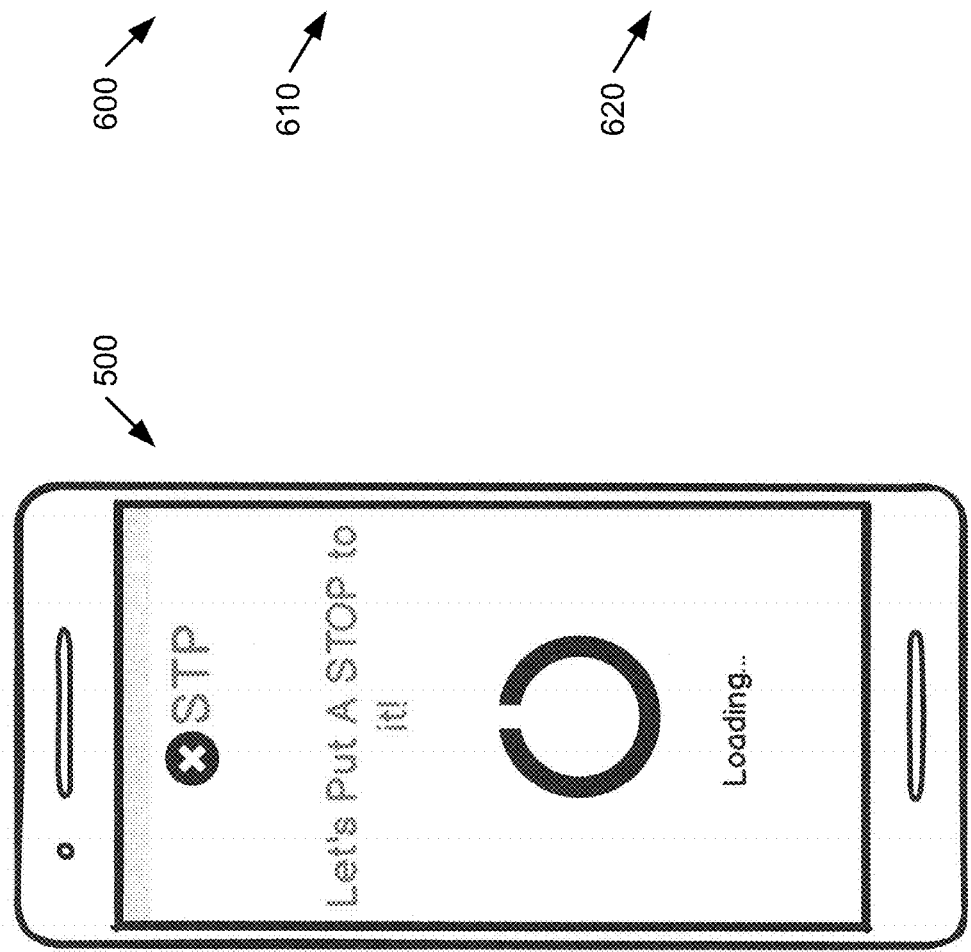

FIG. 5 illustrates a user interface 500 of the sex trafficking prevention mobile application displayed as a splash screen or intermediate screen during processing or loading of the sex trafficking prevention mobile application or other user interfaces of the sex trafficking prevention mobile application.

Figure 6:
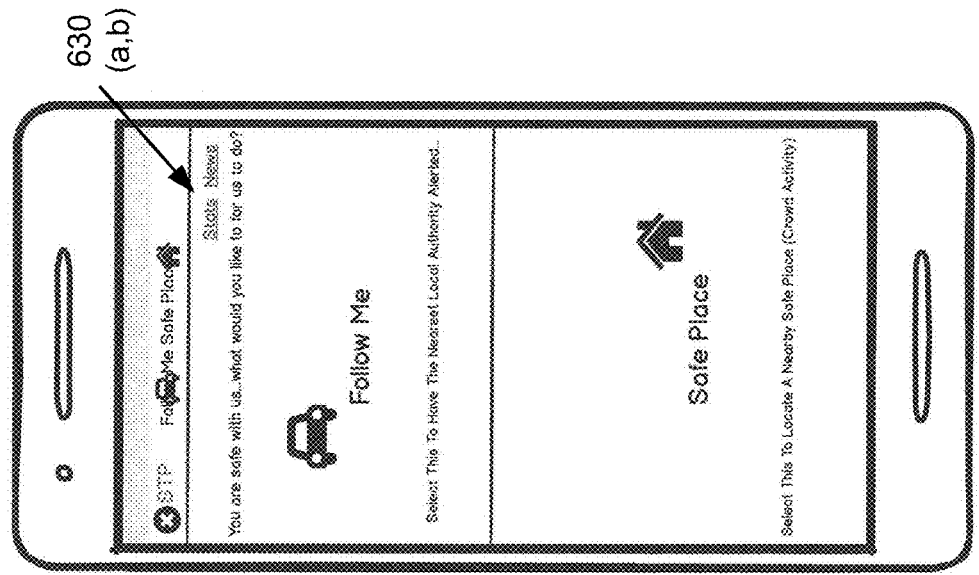

FIG. 6 illustrates a user interface 600 of the sex trafficking prevention mobile application displayed to allow a user to select a feature or operation mode of the sex trafficking prevention mobile application. As shown in FIG. 6, in some implementations, the user interface 600 allows a user to select a first option or a second option for the operation mode of the sex trafficking prevention mobile application. In some implementations, the user interface 600 allows a user to select other options 630.

In some implementations, the first option is a "Follow Me" operation mode of the sex trafficking prevention mobile application ("follow me mode 610"). In some implementations, the second option is a "Safe Place" operation mode of the sex trafficking prevention mobile application ("safe place mode 620").

As described above, in some implementations, a selection of the follow me mode 610 causes the sex trafficking prevention mobile application to track the location of the portable computing device, such as a smart phone or similar device, on which the sex trafficking prevention mobile application is installed. In this way, in some implementations, the location of a user of the sex trafficking prevention mobile application on the portable computing device, such as an evading or kidnapped sex trafficking victim, can be tracked by other users of the sex trafficking prevention mobile application, such as community members, law enforcement, and/or other applicable persons (e.g., family, friends, etc.).

As described above, in some implementations, a selection of the safe place mode 620 causes the sex trafficking prevention mobile application to allow a user, such as a potential sex trafficking victim, to look for a nearby "safe place" where the user can go to avoid or escape a sex trafficker attack. In some implementations, the available "safe places" are locations marked by other users using the sex trafficking prevention mobile application, such as local community members.

As shown in FIG. 6, in some implementations, the user interface 600 allows a user to select other options 630, such as for the sex trafficking prevention mobile application to display sex trafficking related statistics or news. In some implementations, these other options 630 are displayed in other user interfaces which are described below.

FIG. 7 illustrates a user interface 700 of the sex trafficking prevention mobile application displayed as a splash screen or intermediate screen during processing or loading of other user interfaces of the sex trafficking prevention mobile application in response to a selection of the follow me mode 610 from the above described user interface 600.

As shown in FIG. 7, in some implementations, the user interface 700 may display a confirmation message of the follow me mode 610 selection. In some implementations, the user interface 700 may display other messages, such as a confirmation that other users of the sex trafficking prevention mobile application or law enforcement have been alerted in response to the follow me mode 610 selection.

FIG. 8 illustrates a user interface 800 of the sex trafficking prevention mobile application for the follow me mode 610 selected from the above described user interface 600. In some implementations, the "follow me interface" 800 displays an interactive map 810, a chat window 820, and a map legend 830.

As shown in FIG. 8, in some implementations, the interactive map 810 shows a map representation of the area that includes the location 810a of a user-victim, such as an evading or kidnapped sex trafficking victim, and the location 810b of a user-help, such as a community member. In some implementations, the location representation may include a personal image (e.g., a facial image) of the user-victim and/or of the user-help to help confirm the identity for safety.

In some implementations, the interactive map 810 may also show the location 810c of law enforcement (e.g., police) or other applicable responder and the location 810d of a suspected, known, and/or aggressing sex trafficker (e.g., who is stalking or attacking the user-victim). In some implementations, the interactive map 810 may also show the planned or recommended route 810e of the user-victim.

In some implementations, the locations 810a, 810b, 810c, 810d shown by the interactive map 810 may be updated (e.g., in real-time) as applicable for changes.

In some implementations, the interactive map 810 is configured to allow a user to interact with any one or more suitable features of or related to the interactive map 810. For example, in some implementations, the interactive map 810 is configured to allow a user to touch-select the interactive map 810 to activate one or more features to use the interactive map 810.

As shown in FIG. 8, in some implementations, the chat window 820 may include communications, such as text or instant messaging, from the user-victim, user-help, and/or law enforcement. In some implementations, the communications are related to the follow me feature of the sex trafficking prevention mobile application, such as described above, to help prevent a sex trafficker attack.

In some implementations, the map legend 830 may show and define icons, symbols, etc. that are displayed in the interactive map 810, such as the icons used for the locations 810a, 810b, 810c, 810d.

Figures 9, 10:
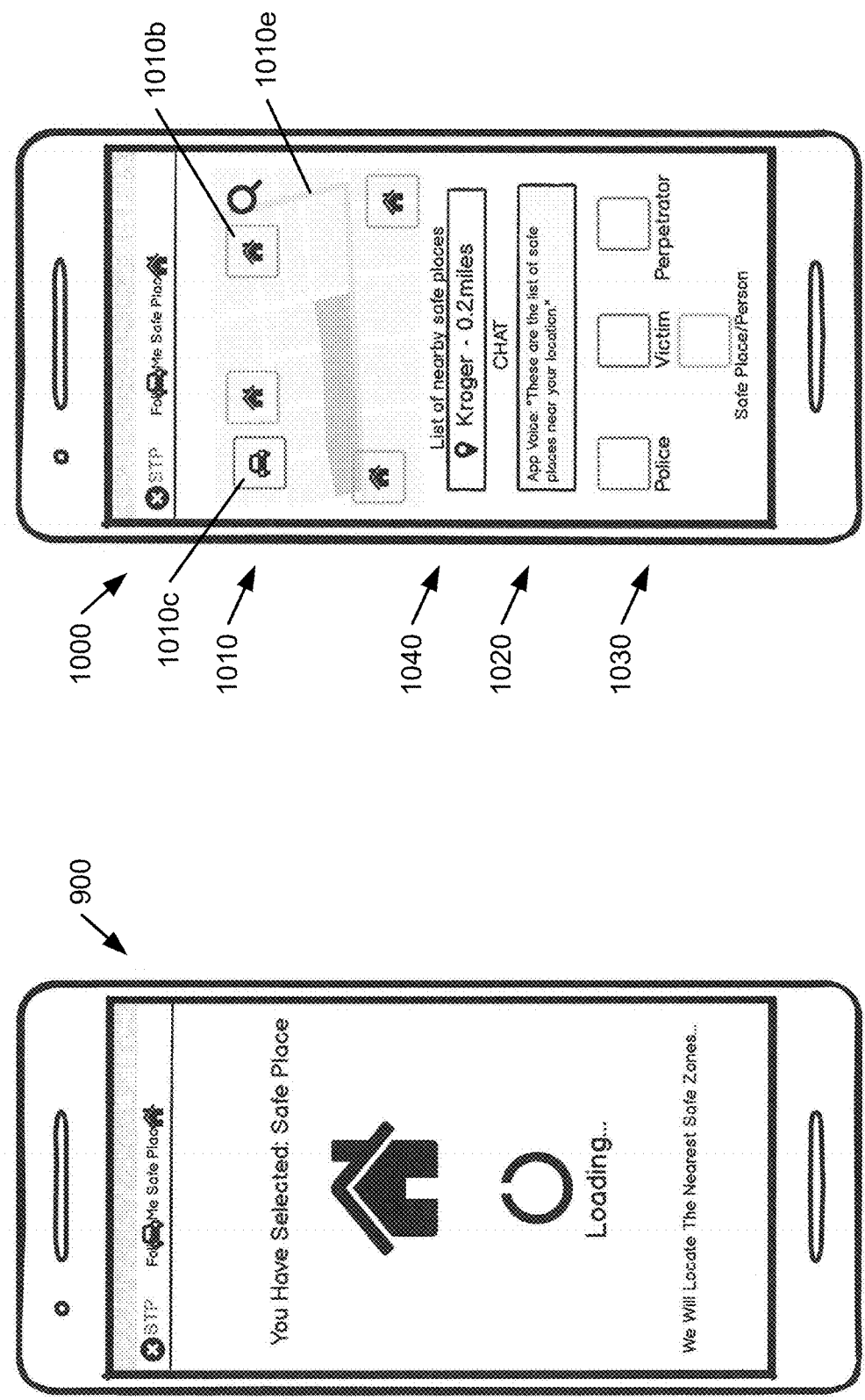

FIG. 9 illustrates a user interface 900 of the sex trafficking prevention mobile application displayed as a splash screen or intermediate screen during processing or loading of other user interfaces of the sex trafficking prevention mobile application in response to a selection of the safe place mode 620 from the above described user interface 600.

As shown in FIG. 9, in some implementations, the user interface 900 may display a confirmation message of the safe place mode 620 selection. In some implementations, the user interface 900 may display other messages, such as a confirmation that nearby safe places will be found and displayed by the sex trafficking prevention mobile application in response to the safe place mode 620 selection.

FIG. 10 illustrates a user interface 1000 of the sex trafficking prevention mobile application for the safe place mode 620 selected from the above described user interface 600. In some implementations, the "safe place interface" 1000 displays an interactive map 1010, a chat window 1020, a map legend 1030, and a safe place list 1040.

As shown in FIG. 10, in some implementations, the interactive map 1010 shows a map representation of the area that is currently local to a user-victim of the sex trafficking prevention mobile application, such as a potential sex trafficking victim. In some implementations, the interactive map 1010 includes the location 1010*b* of one or more safe places, such as the home or business of a user-help such as a local community member. In some implementations, the location representation may include an image of the safe place to help a user-victim confirm the location for safety.

In some implementations, the interactive map 1010 may also show the location 1010*c* of law enforcement (e.g., police) or other applicable authorities. In some implementations, the interactive map 1010 may also show the planned or suggested route 1010*e* of the user-victim.

In some implementations, the interactive map 1010 may further include a current location representation of the user-victim and of suspected or known sex traffickers (e.g., similar to the interactive map 810 of FIG. 8).

In some implementations, the locations 1010*b*, 1010*c* shown by the interactive map 1010 may be updated (e.g., in real-time) as applicable for changes.

In some implementations, the interactive map 1010 is configured to allow a user to interact with any one or more suitable features of or related to the interactive map 1010. For example, in some implementations, the interactive map 1010 is configured to allow a user to touch-select the interactive map 1010 to activate one or more features to use the interactive map 1010.

As shown in FIG. 10, in some implementations, the chat window 1020 may include communications related to the safe places feature of the sex trafficking prevention mobile application, such as described above, to help prevent a sex trafficker attack.

In some implementations, the map legend 1030 may show and define icons, symbols, etc. that are displayed in the interactive map 1010, such as the icons used for the locations 1010*b*, 1010*c*.

As shown in FIG. 10, in some implementations, the safe place list 1040 includes the name of nearby safe places and their distance from the current location of the user-victim. In some implementations, the safe place list 1040 may include any other suitable information regarding the safe places.

Figures 11, 12:
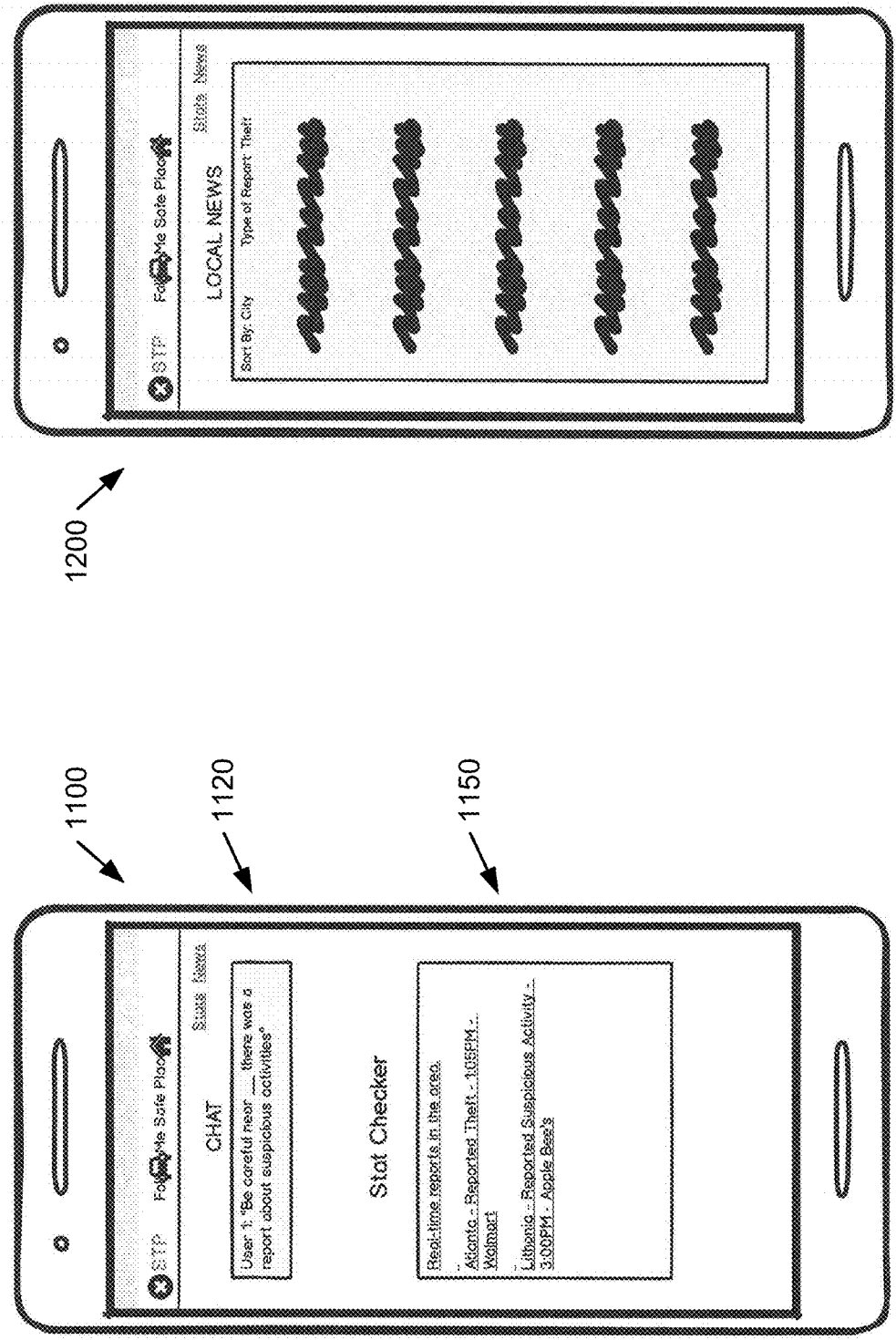

FIG. 11 illustrates a user interface 1100 of the sex trafficking prevention mobile application for sex trafficking related "statistics". In some implementations, the statistics interface 1100 includes a chat window 1120 and a data window 1150.

As shown in FIG. 11, in some implementations, the chat window 1120 may include communications, such as text or instant messaging, from users of the sex trafficking prevention mobile application, such as potential sex trafficker victims, community members, and/or law enforcement. In some implementations, the communications are related to sex trafficking prevention, such as warnings, alerts, etc. regarding sex trafficking attacks or other activity.

As shown in FIG. 11, in some implementations, the data window 1150 may include text of or hyperlinks to sex trafficking related statistics, such as real-time reports and other sex trafficking related information.

FIG. 12 illustrates a user interface 1200 of the sex trafficking prevention mobile application for sex trafficking related "news". As shown in FIG. 12, in some implementations, the user interface 1200 displays sex trafficking related news information. For example, in some implementations, the interface 1200 may display text of or hyperlinks to the news information.

In some implementations, the displayed news information may be sortable by location, such as by city or neighborhood. In some implementations, the displayed news information may be sortable by the type of news, such as by the type or category of sex trafficking attack.

In some implementations, a method of using the sex trafficking prevention mobile application comprises using the sex trafficking prevention mobile application as a mobile application on a portable computing device, such as a smart phone or similar device. In some implementations, the method may comprise using the sex trafficking prevention mobile application as a corresponding software application on a computing device, such as a laptop or desktop computer.

In some implementations, the method comprises creating a user account with the above described user interface 300 of the sex trafficking prevention mobile application shown in FIG. 3. In some implementations, the method comprises logging in to the user account of the sex trafficking prevention mobile application with the above described user interface 400 shown in FIG. 4.

In some implementations, the method may not comprise creating and/or logging in to a user account to use the features of the sex trafficking prevention mobile application.

In some implementations, the method comprises selecting a feature or operation mode of the sex trafficking prevention mobile application with the above described user interface 600 shown in FIG. 6. In some implementations, the above described follow me mode 610, safe place mode 620, or other options 630 may be selected.

In some implementations, if the follow me mode 610 is selected, the method comprises using the above described features of the follow me mode 610 with the above described follow me interface 800 shown in FIG. 8. In some implementations, the above described interactive map 810, chat window 820, and/or map legend 830 displayed in the follow me interface 800 may be used.

In some implementations, if the safe place mode 620 is selected, the method comprises using the above described features of the safe place mode 620 with the above described safe place interface 1000 shown in FIG. 10. In some implementations, the above described interactive map 1010, chat window 1020, map legend 1030, and/or safe place list 1040 displayed in the safe place interface 1000 may be used.

In some implementations, if the statistics option 630*a* is selected, the method comprises using the above described statistics interface 1100 shown in FIG. 11. In some implementations, the above described chat window 1120 and/or data window 1150 displayed in the statistics interface 1100 may be used.

In some implementations, if the news option 630*b* is selected, the method comprises using the above described news interface 1200 shown in FIG. 12. In some implementations, the above described sex trafficking related news information displayed in the news interface 1200 may be viewed or otherwise used.

In some implementations, the displayed sex trafficking related news information may be sorted as described above with the news interface 1200.

FIG. 1 illustrates an implementation of an example environment 100 of a sex trafficking prevention mobile application according to the present disclosure.

As shown in FIG. 1, in some implementations, the environment 100 may include one or more client devices 110a and 110b (collectively "client devices 110"), wireless cellular network 120, network 125, and servers 130. In some implementations, the environment 100 may also include one or more data storages 130a linked to the servers 130.

As described above, in some implementations, a computing device ("client device") 110 may be used to prevent sex trafficking by helping victims to avoid or escape attack by sex traffickers. In some implementations, the client device 110 may be used to guide victims to nearby safe locations to avoid or escape attack by sex traffickers. In some implementations, the client device 110 may be used to help victims to request nearby help from the community to avoid or escape attack by sex traffickers.

As described above, in some implementations, the client device 110 may be used to prevent sex trafficking by helping kidnapped victims to escape his or her kidnapper. In some implementations, the client device 110 may be used to allow a kidnapped victim to signal for help. In some implementations, the client device 110 may be used to allow a kidnapped victim to connect with other users of the sex trafficking prevention mobile application for help.

As described above, in some implementations, the client device 110 may be used to allow a user, such as an evading or kidnapped sex trafficking victim, to send out a request for help that can be received by other users of the sex trafficking prevention mobile application without having to go through the police or other applicable authorities. In some implementations, the client device 110 may be used to allow a user, such as a potential sex trafficking victim, to look for nearby "safe places" where the user can go to avoid or escape a sex trafficker attack.

In some implementations, the client device 110 may be used to allow users, such as a local community member, to mark his or her location as a "safe place" so that a user, such as a potential sex trafficking victim, can find the safe place using the sex trafficking prevention mobile application to avoid or escape a sex trafficker attack.

As described above, in some implementations, the client device 110 may be used to track the location of a user, such as an evading or kidnapped sex trafficking victim. In some implementations, the client device 110 may be used to allow the user to select a "follow me" option so that the user's location can be tracked by other users of the sex trafficking prevention mobile application, such as community members, law enforcement, and/or other applicable persons (e.g., family, friends, etc.).

As described above, in some implementations, the client device 110 may be used to allow a user to update his or her status. In some implementations, the client device 110 may be used to allow a user, such as an evading or escaping sex trafficking victim, to label himself or herself "safe" once he or she is no longer threatened by a sex trafficker attack. In some implementations, the client device 110 may be used to allow a user to communicate directly with the police or other applicable authorities for help, such as via text or instant messaging.

As described above, in some implementations, the client device 110 may be used to allow a user to post messages or alerts, such as the location of a suspected sex trafficker or other suspicious person, that can be viewed by other users of the sex trafficking prevention mobile application. In some implementations, the client device 110 may be used to allows users to share information among each other to help avoid and prevent sex trafficker attacks.

As described above, in some implementations, the client device 110 may be used to display a news feed that reports relevant news and information to help avoid and prevent sex trafficking.

As described above, in some implementations, the client device 110 may be used to display a user interface 300 that allows a user to create an account for use of the features of the sex trafficking prevention mobile application. In some implementations, the client device 110 may be used to display a user interface 400 that allows a user to login to an account for use of the features of the sex trafficking prevention mobile application.

As described above, in some implementations, the client device 110 may be used to display a user interface 500, 700, 900 for a splash screen or intermediate screen during processing or loading of the sex trafficking prevention mobile application or other user interfaces of the sex trafficking prevention mobile application.

As described above, in some implementations, the client device 110 may be used to display a user interface 600 that allows a user to select a follow me mode 610, a safe place mode 620, or other operation modes 630 of the sex trafficking prevention mobile application.

As described above, in some implementations, the client device 110 may be used to display a user interface 800 for the follow me mode 610 that includes an interactive map 810, a chat window 820, and a map legend 830. In some implementations, the client device 110 may be used to display a user interface 1000 for the safe place mode 620 that includes an interactive map 1010, a chat window 1020, a map legend 1030, and a safe place list 1040.

As described above, in some implementations, the client device 110 may be used to display a user interface 1100 for sex trafficking related "statistics" that includes a chat window 1120 and a data window 1150. In some implementations, the client device 110 may be used to display a user interface 1200 for sex trafficking related "news" that includes text of or hyperlinks to sex trafficking related news information.

Client devices 110a and 110b (collectively "client devices 110") are depicted as a mobile phone 110a and a desktop computer 110b, respectively, but client devices 110 may comprise any type of computing device, such as a desktop computer system, a laptop, cellular phone, a smart device, a mobile telephone, a tablet-style computer, or any other device capable of wireless or wired communication. In some implementations, client devices 110 are configured to interact with the server 130 via an application, such as a web browser or a native application, residing on the client device 110.

In some implementations, the client devices 110 include hardware, software, or embedded logic components or a combination of two or more such components and is configured to carry out the appropriate functions implemented or supported by the client devices 110.

In some implementations, the client devices 110 may include one or more processors, one or more memories, one or more displays, one or more interfaces, one or more components capable of inputting data, one or more components capable of outputting data, one or more components capable of communicating with any other component of the environment 100 or any other component suitable for a particular purpose.

In some implementations, the client devices 110 are configured to access networks 120 and/or 125. In some implementations, the client devices 110 are configured to communicate with servers 130.

In some implementations, the client devices 110 can connect to the network 125 through a wireless cellular network 120, such as GPRS-based and CDMA-based wireless networks, as well as 802.16 WiMax and long-range wireless data networks.

In some implementations, components of the environment 100 may communicate with any other component of the environment 100 over network 125. Network 125 may be any suitable network. In some implementations, for example, one or more portions of network 125 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another network 125, or a combination of two or more of the foregoing.

In some embodiments, components of the environment 100 may be configured to communicate over links 150. Links 150 may connect components of the environment 100 to networks 120, 125 or to each other. In some implementations, one or more links 150 may include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 may each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links 150. Links 150 may not be the same throughout the environment 100.

In some implementations, the server devices 130 may include a processor, memory, user accounts, and one or more modules to perform various functions such as those described above.

In some implementations, each server 130 may be a unitary server or may be a distributed server spanning multiple computers or multiple datacenters. Servers 130 may be of various types, such as, for example and without limitation, web server, file server, application server, exchange server, database server, or proxy server. In some implementations, each server 130 may include hardware, software, or embedded logic components or a combination of two or more such components for carrying out the appropriate functionalities implemented or supported by server 130. For example, a web server is generally capable of hosting websites containing web pages or particular elements of web pages. More specifically, a web server may host HTML files or other file types, or may dynamically create or constitute files upon a request, and communicate them to clients 110 in response to HTTP or other requests from clients 110. A database server is generally capable of providing an interface for managing data stored in one or more data stores.

In some implementations, one or more data storages 130a may be communicatively linked to one or more servers 130, respectively, via one or more links 150. In some implementations, data storages 130a may be used to store various types of information. In some implementations, the information stored in data storages 130a may be organized according to specific data structures. In particular embodiment, each data storage 130a may be a relational database. Particular embodiments may provide interfaces that enable servers 130 or clients 110 to manage, e.g., retrieve, modify, add, or delete, the information stored in data storage 130a.

Figure 2:
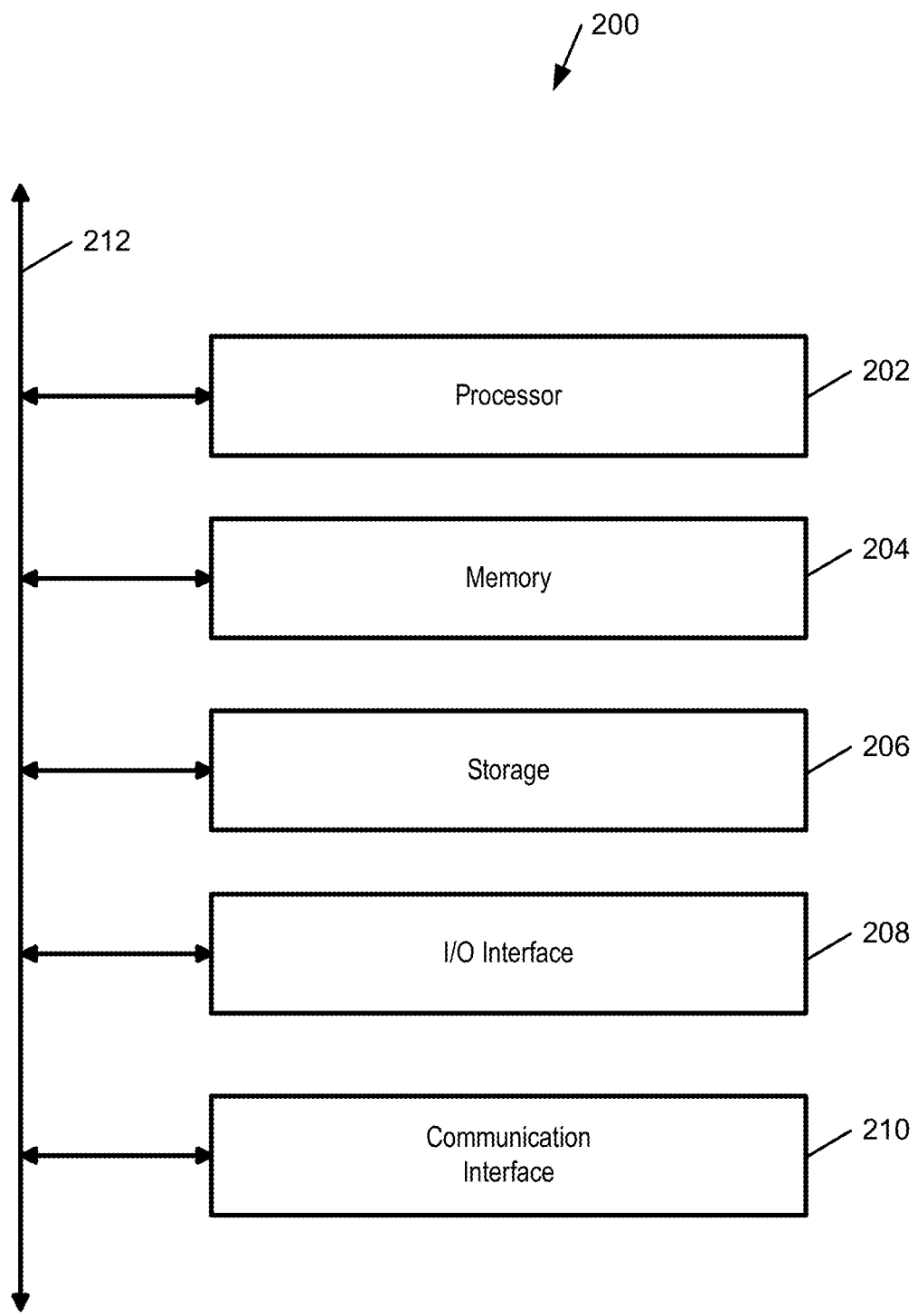
FIG. 2 illustrates an example computer system, which may be used with implementations of the present disclosure.

FIG. 2 illustrates an example computer system 200, which may be used with some implementations of the present invention. This disclosure contemplates any suitable number of computer systems 200.

This disclosure contemplates computer system 200 taking any suitable physical form. In some implementations, as an example and not by way of limitation, computer system 200 may be an embedded computer system, a system-on-chip (SOC), a single-board computer system (SBC) (such as, for example, a computer-on-module (COM) or system-on-module (SOM)), a desktop computer system, a laptop, an interactive kiosk, a mainframe, a mesh of computer systems, a mobile telephone, a personal digital assistant (PDA), a server, or a combination of two or more of these.

In some implementations, where appropriate, computer system 200 may include one or more computer systems 200; be unitary or distributed; span multiple locations; span multiple machines; or reside in a cloud, which may include one or more cloud components in one or more networks.

In some implementations, where appropriate, one or more computer systems 200 may perform without substantial spatial or temporal limitation one or more steps of one or more methods described or illustrated herein. In some implementations, as an example and not by way of limitation, one or more computer systems 200 may perform in real time or in batch mode one or more steps of one or more methods described or illustrated herein. In some implementations, one or more computer systems 200 may perform at different times or at different locations one or more steps of one or more methods described or illustrated herein, where appropriate.

In some implementations, computer system 200 includes a processor 202, memory 204, storage 206, an input/output (I/O) interface 208, a communication interface 210, and a bus 212. Although this disclosure describes and illustrates a particular computer system having a particular number of particular components in a particular arrangement, this disclosure contemplates any suitable computer system having any suitable number of any suitable components in any suitable arrangement.

In some implementations, processor 202 includes hardware for executing instructions, such as those making up a computer program. In some implementations, as an example and not by way of limitation, to execute instructions, processor 202 may retrieve (or fetch) the instructions from an internal register, an internal cache, memory 204, or storage 206; decode and execute them; and then write one or more results to an internal register, an internal cache, memory 204, or storage 206.

In some implementations, processor 202 may include one or more internal caches for data, instructions, or addresses. The present disclosure contemplates processor 202 including any suitable number of any suitable internal caches, where appropriate. In some implementations, as an example and not by way of limitation, processor 202 may include one or more instruction caches, one or more data caches, and one or more translation look-aside buffers (TLBs).

In some implementations, instructions in the instruction caches may be copies of instructions in memory 204 or storage 206, and the instruction caches may speed up retrieval of those instructions by processor 202.

In some implementations, data in the data caches may be copies of data in memory 204 or storage 206 for instructions executing at processor 202 to operate on; the results of previous instructions executed at processor 202 for access by subsequent instructions executing at processor 202 or for writing to memory 204 or storage 206; or other suitable data.

In some implementations, the data caches may speed up read or write operations by processor 202. In some implementations, the TLBs may speed up virtual-address translation for processor 202.

In some implementations, processor 202 may include one or more internal registers for data, instructions, or addresses. The present disclosure contemplates processor 202 including any suitable number of any suitable internal registers, where appropriate. Where appropriate, processor 202 may include one or more arithmetic logic units (ALUs); be a multi-core processor; or include one or more processors 202. Although this disclosure describes and illustrates a particular processor, this disclosure contemplates any suitable processor.

In some implementations, memory 204 includes main memory for storing instructions for processor 202 to execute or data for processor 202 to operate on. In some implementations, as an example and not by way of limitation, computer system 200 may load instructions from storage 206 or another source (such as, for example, another computer system 200) to memory 204.

In some implementations, processor 202 may then load the instructions from memory 204 to an internal register or internal cache. In some implementations, to execute the instructions, processor 202 may retrieve the instructions from the internal register or internal cache and decode them.

In some implementations, during or after execution of the instructions, processor 202 may write one or more results (which may be intermediate or final results) to the internal register or internal cache. In some implementations, processor 202 may then write one or more of those results to memory 204.

In some implementations, processor 202 executes only instructions in one or more internal registers or internal caches or in memory 204 (as opposed to storage 206 or elsewhere) and operates only on data in one or more internal registers or internal caches or in memory 204 (as opposed to storage 206 or elsewhere).

In some implementations, one or more memory buses (which may each include an address bus and a data bus) may couple processor 202 to memory 204. In some implementations, bus 212 may include one or more memory buses, as described below.

In some implementations, one or more memory management units (MMUs) reside between processor 202 and memory 204 and facilitate accesses to memory 204 requested by processor 202.

In some implementations, memory 204 includes random access memory (RAM). In some implementations, this RAM may be volatile memory, where appropriate.

In some implementations, where appropriate, this RAM may be dynamic RAM (DRAM) or static RAM (SRAM). Moreover, in some implementations, where appropriate, this RAM may be single-ported or multi-ported RAM. The present disclosure contemplates any suitable RAM.

In some implementations, memory 204 may include one or more memories 204, where appropriate. Although this disclosure describes and illustrates particular memory, this disclosure contemplates any suitable memory.

In some implementations, storage 206 includes mass storage for data or instructions. In some implementations, as an example and not by way of limitation, storage 206 may include an HDD, a floppy disk drive, flash memory, an optical disc, a magneto-optical disc, magnetic tape, or a Universal Serial Bus (USB) drive or a combination of two or more of these.

In some implementations, storage 206 may include removable or non-removable (or fixed) media, where appropriate. In some implementations, storage 206 may be internal or external to computer system 200, where appropriate. In some implementations, storage 206 is non-volatile, solid-state memory.

In some implementations, storage 206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 206 taking any suitable physical form.

In some implementations, storage 206 may include one or more storage control units facilitating communication between processor 202 and storage 206, where appropriate. In some implementations, where appropriate, storage 206 may include one or more storages 206. Although this disclosure describes and illustrates particular storage, this disclosure contemplates any suitable storage.

In some implementations, I/O interface 208 includes hardware, software, or both providing one or more interfaces for communication between computer system 200 and one or more I/O devices. In some implementations, computer system 200 may include one or more of these I/O devices, where appropriate.

In some implementations, one or more of these I/O devices may enable communication between a person and computer system 200. In some implementations, as an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

In some implementations, an I/O device may include one or more sensors. This disclosure contemplates any suitable I/O devices and any suitable I/O interfaces 208 for them.

In some implementations, where appropriate, I/O interface 208 may include one or more device or software drivers enabling processor 202 to drive one or more of these I/O devices. I/O interface 208 may include one or more I/O interfaces 208, where appropriate. Although this disclosure describes and illustrates a particular I/O interface, this disclosure contemplates any suitable I/O interface.

In some implementations, communication interface 210 includes hardware, software, or both providing one or more interfaces for communication (such as, for example, packet-based communication) between computer system 200 and one or more other computer systems 200 or one or more networks.

In some implementations, as an example and not by way of limitation, communication interface 210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 210 for it.

In some implementations, as an example and not by way of limitation, computer system 200 may communicate with an ad hoc network, a personal area network (PAN), a local area network (LAN), a wide area network (WAN), a metropolitan area network (MAN), or one or more portions of the Internet or a combination of two or more of these.

In some implementations, one or more portions of one or more of these networks may be wired or wireless. In some implementations, as an example, computer system 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In some implementations, computer system 200 may include any suitable communication interface 210 for any of these networks, where appropriate. In some implementations, communication interface 210 may include one or more communication interfaces 210, where appropriate. Although this disclosure describes and illustrates a particular communication interface, this disclosure contemplates any suitable communication interface.

In some implementations, bus 212 includes hardware, software, or both coupling components of computer system 200 to each other. In some implementations, as an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these.

In some implementations, bus 212 may include one or more buses 212, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. In some implementations, as an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate.

Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101.

This disclosure contemplates one or more computer-readable storage media implementing any suitable storage. In some implementations, a computer-readable storage medium implements one or more portions of processor 202 (such as, for example, one or more internal registers or caches), one or more portions of memory 204, one or more portions of storage 206, or a combination of these, where appropriate.

In some implementations, a computer-readable storage medium implements RAM or ROM. In some implementations, a computer-readable storage medium implements volatile or persistent memory.

In some implementations, one or more computer-readable storage media embody software. Herein, reference to software may encompass one or more applications, bytecode, one or more computer programs, one or more executables, one or more instructions, logic, machine code, one or more scripts, or source code, and vice versa, where appropriate.

In some implementations, software includes one or more application programming interfaces (APIs). This disclosure contemplates any suitable software written or otherwise expressed in any suitable programming language or combination of programming languages.

In some implementations, software is expressed as source code or object code. In some implementations, software is expressed in a higher-level programming language, such as, for example, C, Perl, or a suitable extension thereof. In some implementations, software is expressed in a lower-level programming language, such as assembly language (or machine code).

In some implementations, software is expressed in JAVA. In some implementations, software is expressed in Hyper Text Markup Language (HTML), Extensible Markup Language (XML), or other suitable markup language.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example. it will apparent to one of ordinary skill in the art that the invention may be used with any electronic network service, even if it is not provided through a website.

Any computer-based system that provides networking functionality can be used in accordance with the present invention even if it relies, for example, on e-mail, instant messaging or other forms of peer-to-peer communications, and any other technique for communicating between users. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

The present invention has been explained with reference to specific embodiments. For example, while embodiments of the present invention have been described as operating in connection with a network system, the present invention can be used in connection with any communications facility that allows for communication of messages between users, such as an email hosting site. Other embodiments will be evident to those of ordinary skill in the art. It is therefore not intended that the present invention be limited, except as indicated by the appended claims.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The present disclosure encompasses all changes, substitutions, variations, alterations, and modifications to the example embodiments herein that a person having ordinary skill in the art would comprehend.

The figures, including photographs and drawings, comprised herewith may represent one or more implementations of the sex trafficking prevention mobile application.

Details shown in the figures, such as dimensions, descriptions, etc., are exemplary, and there may be implementations of other suitable details according to the present disclosure.

Reference throughout this specification to "an embodiment" or "implementation" or words of similar import means that a particular described feature, structure, or characteristic is comprised in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations may be depicted in the drawings in a particular order, this should not be understood as requiring that such operations be performed in the particular order shown or in sequential order, or that all illustrated operations be performed, to achieve desirable results.

The invention claimed is:

1. A computer-implemented method for sex trafficking prevention, the method comprising:
    receiving at a first computing device safe place location information of the location of one or more safe places transmitted over a network from one or more safe place computing devices respectively,
    transmitting by the first computing device the safe place location information over a network to a second computing device;
    receiving at the first computing device an alert and location information transmitted over a network from the second computing device wherein the location information comprises the location of the second computing device;
    transmitting by the first computing device the alert and the location information of the second computing device over a network to one or more of the safe place computing devices;
    receiving at the one or more safe place computing devices the location information of the second computing device;
    providing by the first computing device a communication link between the second computing device and at least one of the one or more safe place computing devices; and
    for each of the one or more safe place computing devices, displaying on the safe place computing device a map indicating the location of the second computing device and the location of the safe place computing device, wherein:
    the first computing device periodically receives the location information of the second computing device from the second computing device and transmits the location information of the second computing device to the one or more safe place computing devices until receiving a safe message from the second computing device.

\* \* \* \* \*